(12) United States Patent
Takemoto et al.

(10) Patent No.: US 11,063,497 B2
(45) Date of Patent: Jul. 13, 2021

(54) DRIVE DEVICE

(71) Applicant: Nidec Corporation, Kyoto (JP)

(72) Inventors: Shinji Takemoto, Kyoto (JP); Tomoya Ueda, Kyoto (JP); Kosuke Mizuike, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 45 days.

(21) Appl. No.: 16/299,204

(22) Filed: Mar. 12, 2019

(65) Prior Publication Data

US 2019/0288586 A1 Sep. 19, 2019

(30) Foreign Application Priority Data

Mar. 16, 2018 (JP) .............................. JP2018-049288

(51) Int. Cl.
| | |
|---|---|
| *H02K 1/18* | (2006.01) |
| *H02K 7/16* | (2006.01) |
| *H02K 9/19* | (2006.01) |
| *H02K 11/33* | (2016.01) |
| *H02K 7/116* | (2006.01) |
| *H02K 7/18* | (2006.01) |
| *B62M 6/65* | (2010.01) |

(52) U.S. Cl.
CPC ............. *H02K 11/33* (2016.01); *H02K 1/185* (2013.01); *H02K 7/116* (2013.01); *H02K 7/1846* (2013.01); *H02K 9/19* (2013.01); *B62M 6/65* (2013.01)

(58) Field of Classification Search
CPC ............ H02K 1/185; H02K 5/12; H02K 5/18; H02K 7/116; H02K 7/1846; H02K 9/19; B60K 17/04; B62M 6/65
See application file for complete search history.

(56) References Cited

U.S. PATENT DOCUMENTS

| | | |
|---|---|---|
| 6,100,615 A | 8/2000 | Birkestrand |
| 2005/0264111 A1 | 12/2005 | Tanaka et al. |
| 2012/0080965 A1* | 4/2012 | Bradfield ................. H02K 1/20 310/58 |
| 2016/0288901 A1 | 10/2016 | Fisher et al. |

FOREIGN PATENT DOCUMENTS

| | | |
|---|---|---|
| JP | 3939865 B2 | 7/2007 |
| JP | 2009012542 A * | 1/2009 |

OTHER PUBLICATIONS

Tsuruoka, Machine Translation of JP2009012542, Jan. 2009 (Year: 2009).*

* cited by examiner

*Primary Examiner* — Quyen P Leung
*Assistant Examiner* — Eric Johnson
(74) *Attorney, Agent, or Firm* — Keating & Bennett

(57) ABSTRACT

A drive device includes a hollow hub rotatable about hub shafts extending parallel to a center axis, a motor housed in the hub and fixed to the hub shafts, and a speed reducer connected to the motor and the hub. The motor includes a rotor including a motor shaft extending parallel to the hub shafts, a stator disposed outside the rotor in a radial direction, and a motor housing holding the stator therein. The drive device includes thermal grease thermally connecting the hub and the motor housing to each other.

8 Claims, 4 Drawing Sheets

DRIVE DEVICE

CROSS REFERENCE TO RELATED APPLICATIONS

This application claims the benefit of priority to Japanese Patent Application No. 2018-049288 filed on Mar. 16, 2018. The entire contents of this application are hereby incorporated herein by reference.

BACKGROUND OF THE INVENTION

1. Field of the Invention

The present disclosure related to a drive device.

2. Description of the Related Art

As a drive device used in electric vehicles such as an electric bicycle, an electric-assist bicycle, and a mobility aid vehicle, there has been conventionally known a drive device including a motor in a hub.

In the aforementioned drive device, the motor is housed in the hub. Accordingly, the drive device has a structure that poorly discharges heat of the motor.

SUMMARY OF THE INVENTION

An example embodiment of the present disclosure provides a drive device including a hollow hub rotatable about a hub shaft extending parallel to a center axis, a motor housed in the hub and fixed to the hub shaft, and a speed reducer connected to the motor and the hub. The motor includes a rotor including a motor shaft extending parallel to the hub shaft, a stator disposed outside the rotor in a radial direction, and a motor housing holding the stator therein. The drive device includes thermal grease thermally connecting the hub and the motor housing to each other.

An example embodiment of the present disclosure provides a drive device with an excellent heat discharging performance.

The above and other elements, features, steps, characteristics and advantages of the present disclosure will become more apparent from the following detailed description of the example embodiments with reference to the attached drawings.

DETAILED DESCRIPTION OF THE PREFERRED EMBODIMENTS

Figure 1:
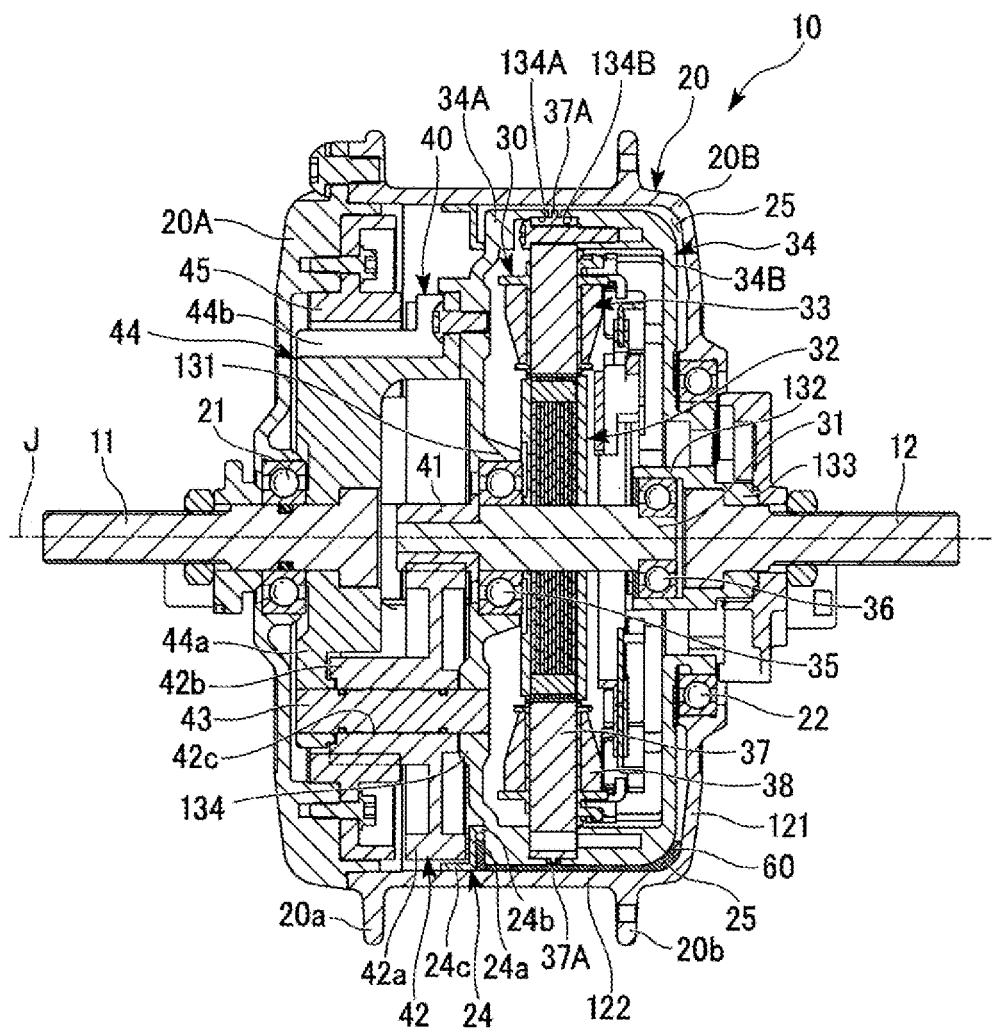
FIG. 1 is a cross-sectional view illustrating a drive device according to a first example embodiment of the present disclosure.

FIG. 1 is a cross-sectional view illustrating a drive device in a first example embodiment.

The drive device 10 in the first example embodiment is used as a drive device of electric vehicles such as an electric bicycle, an electric-assist bicycle, and a mobility aid vehicle.

The drive device 10 includes paired hub shafts 11, 12 fixed to the vehicle, a hollow hub 20 rotatable about a center axis J of the hub shafts 11, 12, a motor 30 housed inside the hub 20 and fixed to the hub shaft 12, and a speed reducer 40 connected to the motor 30 and the hub 20. The motor 30 includes a motor housing 34 fixed to the hub shaft 12. The speed reducer 40 is fixed to the motor housing 34.

The hub shaft 11, the speed reducer 40, the motor housing 34, and the hub shaft 12 are connected and fixed to one another in this order in an axial direction. The hub 20 is rotationally driven about the hub shafts 11, 12 by drive force of the motor 30 and the speed reducer 40 fixed to the hub shafts 11, 12. A structure may be such that one of the hub shafts 11, 12 is fixed to the vehicle.

In the embodiment, a direction parallel to the center axis J is simply referred to as "axial direction." A direction from the motor 30 toward the speed reducer 40 in the axial direction is referred to as a direction toward one side in the axial direction and a direction from the speed reducer 40 toward the motor 30 is referred to as a direction toward the other side in the axial direction. The direction toward the one side in the axial direction is a direction in which a motor shaft 31 protrudes from the motor 30 parallel to the center axis J. The other side in the axial direction is the side on which the motor 30 is fixed to the hub shaft 12. Moreover, the radial direction about the center axis J is simply referred to as "radial direction." A direction approaching the center axis J in the radial direction is referred to as a direction toward the inside in the radial direction and a direction away from the center axis J is referred to as a direction toward the outside in the radial direction. The circumferential direction about the center axis J is simply referred to as "circumferential direction."

The hub 20 is a hollow casing housing the motor 30 and the speed reducer 40. The hub 20 includes a disc shaped lid portion 20A and a bottomed cylinder shaped main body portion 20B. The main body portion 20B is opened toward the one side in the axial direction. The lid portion 20A closes an opening portion of the main body portion 20B from the one side in the axial direction. The lid portion 20A is fastened to the main body portion 20B with bolts.

The main body portion 20B includes a bottom wall portion 121 located on the other side in the axial direction and a tubular portion 122 extending from an outer peripheral edge of the bottom wall portion 121 toward the one side in the axial direction. The motor 30 and the speed reducer 40 are housed in the tubular portion 122 of the main body portion 20B in this order from the bottom wall portion 121 side.

The lid portion 20A holds a first hub bearing 21 in a center portion thereof as viewed in the axial direction. The lid portion 20A is rotatably supported on the hub shaft 11 by the first hub bearing 21. The main body portion 20B holds a second hub bearing 22 in a center portion of the bottom wall portion 121 as viewed in the axial direction. The main body portion 20B is rotatably supported on the motor housing 34 of the motor 30 by the second hub bearing 22.

In the drive device 10 of the embodiment, an annular wall member 24 spreading from an inner wall surface of the hub 20 toward the inside in the radial direction is provided between the motor 30 and the speed reducer 40 in the main body portion 20B.

The wall member 24 includes a disc portion 24a spreading in a direction orthogonal to the axial direction, a cylindrical first protruding wall 24b extending from an end edge of the disc portion 24a on the inside in the radial direction toward the other side in the axial direction, and a cylindrical second protruding wall 24c extending from an end edge of the disc portion 24a on the outside in the radial direction toward the one side in the axial direction along the inner wall surface of the hub 20. The second protruding wall 24c is fixed to the inner wall surface of the hub 20.

Due to the aforementioned configuration, the drive device 10 has, in the hub 20, a recess groove 25 whose side walls are the wall member 24 and the bottom wall portion 121 of the main body portion 20B of the hub 20 and whose bottom surface is the inner wall surface of the hub 20 between the wall member 24 and the bottom wall portion 121. The recess groove 25 is opened toward the inside in the radial direction. Specifically, the drive device 10 of the embodiment has a recess portion opened on the inside in the radial direction, on the inner wall surface of the hub 20 facing the motor housing 34 in the radial direction. In other words, the recess portion is located in a region of the inner wall surface of the hub 20 which faces the motor housing 34.

Thermal grease 60 is disposed inside the recess groove 25. The thermal grease 60 thermally connects the hub 20 and the motor housing 34 to each other in the recess groove 25. In other words, the thermal grease 60 thermally connects the hub 20 and the motor housing 34 to each other in the recess portion. Heat generated in the motor 30 is thereby transferred from the motor housing 34 to the hub 20 via the thermal grease 60 and dissipates into the atmosphere from an outer surface of the hub 20. Accordingly, the heat of the motor 30 generated inside the sealed hub 20 can be efficiently discharged.

In the embodiment, the recess groove 25 extends along the entire inner wall surface of the hub 20 in the circumferential direction. In this case, the recess portion is a recess groove extending along the entire inner wall surface of the hub 20 in the circumferential direction. Although the thermal grease 60 is illustrated only in a lower portion of the hub 20 in FIG. 1, the thermal grease 60 actually surrounds the entire outer periphery of the motor housing 34 in the circumferential direction. This causes the heat to be uniformly and radially dissipated from the outer peripheral surface of the motor housing 34 toward the outside in the radial direction. Accordingly, a better heat discharging performance can be obtained.

The thermal grease 60 may be grease with the same composition as lubrication grease used for lubrication of the speed reducer 40. In this configuration, even if the thermal grease 60 leaks to the speed reducer 40 side, only an increase in the amount of the lubrication grease occurs. Accordingly, failure is less likely to occur in the operation of the speed reducer 40.

Note that grease with composition different from the aforementioned lubrication grease can be used as the thermal grease 60 as long as the grease is less likely to affect the operation of the speed reducer 40.

In the embodiment, the recess groove 25 is provided by using the wall member 24. The recess groove 25 can be thereby provided without additionally processing the inner wall surface of the main body portion 20B of the hub 20. Accordingly, the hub 20 can be easily manufactured.

The wall member 24 is located between the motor housing and the speed reducer 40 in the axial direction. This configuration can suppress leakage of the thermal grease 60 from a region between the outer peripheral surface of the motor housing 34 and the inner wall surface of the hub 20 to the speed reducer 40 side.

An inner peripheral end of the wall member 24 is located inside an outer peripheral end of the motor housing 34 in the radial direction. Specifically, the length of the wall member 24 in the radial direction is greater than a gap between the motor housing 34 and the inner wall surface of the hub 20. Leakage of the thermal grease 60 to the speed reducer 40 side can be thereby further suppressed.

The first protruding wall 24b of the wall member 24 extends in the axial direction from the wall member 24 toward the motor housing 34. In this configuration, even if the drive device 10 is overturned due to, for example, overturning of the vehicle, the first protruding wall 24b holds back the flowing thermal grease 60. Accordingly, the thermal grease 60 is less likely to leak to the speed reducer 40 side also in an event of overturning.

The hub 20 includes two connection portions 20a, 20b protruding from the outer peripheral surface thereof toward the outside in the radial direction. Spokes of a wheel including the drive device 10 as an electric hub are connected to the connection portions 20a, 20b.

The motor 30 includes a rotor 32 having the motor shaft extending parallel to the hub shafts 11, 12, a stator 33 disposed outside the rotor 32 in the radial direction, and a motor housing 34 holding therein the stator 33.

The rotor 32 includes a rotor core fixed to the motor shaft 31 and a rotor magnet fixed to an outer peripheral portion of the rotor core. The rotor core is made of, for example, laminated steel plates. The rotor 32 rotates about the center axis J. In other words, the motor shaft 31 extends parallel to the center axis J. The motor shaft 31 is supported on a first bearing 35 and a second bearing 36 held by the motor housing 34.

The stator 33 includes a stator core 37 fixed to the motor housing 34 and a coil 38 wound around teeth of the stator core 37 via an insulator. The stator core 37 is made of, for example, laminated steel plates. The stator core 37 includes protruding portions 37A protruding from an outer peripheral surface of the stator core 37 toward the outside in the radial direction. The protruding portions 37A are provided at multiple positions in the circumferential direction on the outer peripheral surface of the stator core 37. The protruding portions 37A may be disposed outside the multiple teeth of the stator core 37 in the radial direction. The protruding portions 37A may have an annular shape continuous in the circumferential direction.

The motor housing 34 includes a first motor bracket 34A disposed on the one side of the stator 33 in the axial direction and a second motor bracket 34B disposed on the other side of the stator 33 in the axial direction. The motor housing 34 holds the stator 33 such that the stator 33 is held between the first motor bracket 34A and the second motor bracket 34B in the axial direction. Specifically, the motor housing 34 includes the first motor bracket 34A fixed to the one side of the stator 33 in the axial direction and the second motor bracket 34B fixed to the other side of the stator 33 in the axial direction, and the first motor bracket 34A and the second motor bracket 34B face each other with a gap in the axial direction therebetween.

The first motor bracket 34A has a bottomed cylinder shape opened on the other side in the axial direction. The first motor bracket 34A includes a bearing holder 131 which holds the first bearing 35, in an end portion on the one side in the axial direction. Part of the stator core 37 is inserted in an opening portion 134A of the first motor bracket 34A which faces the other side in the axial direction.

The second motor bracket 34B has a bottomed cylinder shape opened on the one side in the axial direction. The second motor bracket 34B includes a bearing holder 132 which holds the second bearing 36 and a hub shaft holder 133 which holds the hub shaft 12, in an end portion on the other side in the axial direction. Part of the stator core 37 is inserted in an opening portion 134B of the second motor bracket 34B which faces the one side in the axial direction. In the embodiment, the stator core 37 is fastened to the second motor bracket 34B with bolts.

The opening portion 134A of the first motor bracket 34A and the opening portion 134B of the second motor bracket 34B face each other in the axial direction with a gap therebetween. In this configuration, since part of the stator 33 is exposed through a gap between the first motor bracket 34A and the second motor bracket 34B, the stator 33 and the thermal grease 60 come into direct contact with each other. The heat of the stator 33 can be thereby efficiently dissipated via the thermal grease 60.

The protruding portions 37A are located between the first motor bracket 34A and the second motor bracket 34B facing each other on the outer peripheral side of the stator core 37. Providing the protruding portions 37A reduces a gap between the stator core 37 and the inner wall surface of the hub 20 in the radial direction. This facilitates thermal connection between the stator core 37 and the hub 20 which is achieved by the thermal grease 60.

In the embodiment, the positions of radial direction outer end edges of the protruding portions 37A are aligned with the position of the outer peripheral surface of the first motor bracket 34A in the radial direction and the position of the outer peripheral surface of the second motor bracket 34B in the radial direction. The protruding portions 37A may protrude outside the outer peripheral surface of the motor housing 34 in the radial direction within a range in which the protruding portions 37A do not interfere with the hub 20. The radial direction outer end edges of the protruding portions 37A may be located inside the outer peripheral surface of the motor housing 34 in the radial direction within a range in which contact with the thermal grease 60 can be maintained.

The speed reducer 40 includes a sun gear 41 connected to an end portion of the motor shaft 31 on the one side in the axial direction, multiple planetary gears 42 disposed outside the sun gear 41 in the radial direction, multiple support shafts 43 rotatably supporting the respective planetary gears 42, a fixing portion 44 fixing the multiple support shafts 43 to the motor 30, and an annular output gear 45 surrounding the multiple planetary gears 42 from the outside in the radial direction. Three sets of the planetary gears 42 and the support shafts 43 are provided in the embodiment.

The sun gear 41 is an external tooth gear coaxial with the motor shaft 31.

The planetary gears 42 are each a two-stage gear including one set of coaxial external tooth gears with different diameters. Each planetary gear 42 includes a small gear 42a located on the one side in the axial direction and a large gear 42b located on the other side in the axial direction. The large gear 42b of the planetary gear 42 mesh with the sun gear 41. The planetary gear 42 has a through hole 42c penetrating the centers of the small gear 42a and the large gear 42b.

The support shafts 43 extend in the axial direction. The support shafts 43 are passed through the through holes 42c of the planetary gears 42. End portions of the support shafts 43 on the one side in the axial direction are fixed to the fixing portion 44. End portions of the support shafts 43 on the other side in the axial direction are fixed to a bottom wall portion 134 of the first motor bracket 34A.

The fixing portion 44 includes a top wall portion 44a to which the end portions of the multiple support shafts 43 on the one side in the axial direction are fixed and multiple leg portions 44b extending from an outer peripheral end of the top wall portion 44a toward the other side in the axial direction. An end portion of the hub shaft 11 on the other side in the axial direction is fixed to the top wall portion 44a. Three leg portions 44b are provided in the embodiment. End portions of the leg portions 44b on the other side in the axial direction are fastened and fixed to the bottom wall portion 134 of the first motor bracket 34A with bolts.

The output gear 45 is an internal tooth gear meshing with the small gears 42a of the planetary gears 42. The output gear 45 is fixed to an inner surface of the lid portion 20A of the hub 20. Specifically, the speed reducer 40 is connected to the motor 30 at the sun gear 41 and is connected to the hub 20 at the output gear 45.

Figure 2:
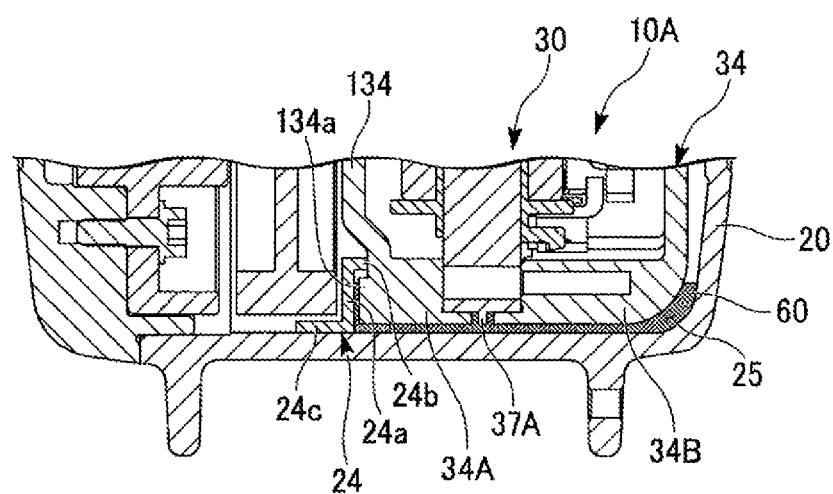
FIG. 2 is a partial cross-sectional view of a drive device according to a first modified example of an example embodiment of the present invention.

FIG. 2 is a partial cross-sectional view of a drive device in a first modified example.

In the drive device 10A in the first modified example, the motor housing 34 includes a tubular wall 134a extending in the axial direction from a position outside the first protruding wall 24b of the wall member 24 in the radial direction toward the wall member 24. The first protruding wall 24b of the wall member 24 and the tubular wall 134a of the motor housing 34 face each other in the radial direction.

In this configuration, the first protruding wall 24b and the tubular wall 134a causes a flow passage of the thermal grease 60 flowing from the recess groove 25 to the outside of the wall member 24 to be a flow passage with a labyrinth structure bent at multiple portions. Accordingly, the thermal grease 60 is less likely to flow out from the recess groove 25 to the speed reducer 40 side.

Although the motor housing 34 has the configuration including the tubular wall 134a in the first modified example, the configuration may be such that an annular groove portion about the center axis J is provided on the surface of the motor housing 34 facing the one side in the axial direction and the first protruding wall 24b of the wall member 24 is inserted in this groove portion.

Figure 3:
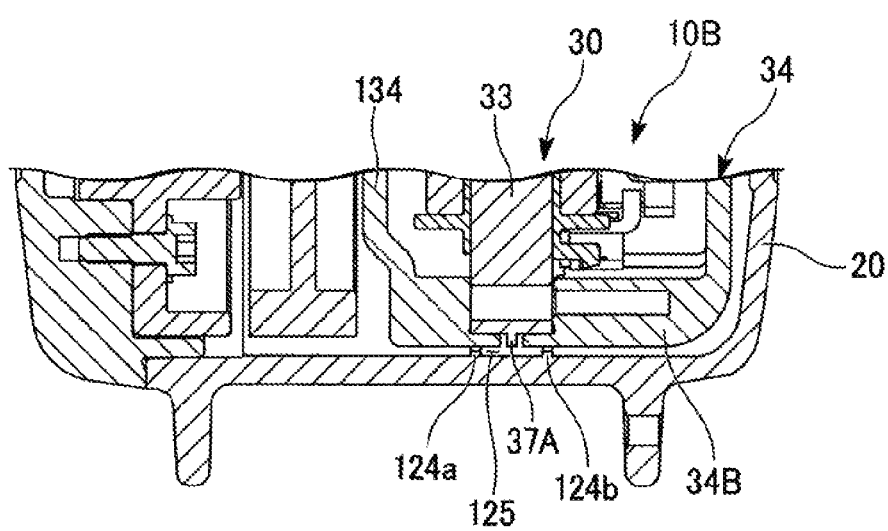
FIG. 3 is a partial cross-sectional view of a drive device according to a second modified example of an example embodiment of the present invention.

FIG. 3 is a partial cross-sectional view of a drive device in a second modified example.

The drive device 10B in the second modified example includes rib portions 124a, 124b protruding toward the outer peripheral surface of the motor housing 34, on the inner wall surface of the hub 20. The rib portions 124a, 124b extend around the entire motor housing 34 in the circumferential direction. The drive device 10B includes a recess groove 125 whose side walls are the rib portion 124a and the rib portion 124b and whose bottom surface is the inner wall surface of the hub 20 located between the rib portions 124a, 124b. The recess groove 125 is opened on the inner side in the radial direction. Specifically, the drive device 10B includes the recess groove 125 as the recess portion facing the motor housing 34 in the radial direction.

The rib portion 124a located on the one side in the axial direction out of the rib portions 124a, 124b faces the outer peripheral surface of the first motor bracket 34A. The rib portion 124b located on the other side in the axial direction faces the outer peripheral surface of the second motor bracket 34B. Accordingly, the recess groove 125 is located in a region of the inner wall surface of the hub 20 which faces the motor housing 34 in the radial direction. To be more specific, the recess groove 125 faces the axial direction gap between the first motor bracket 34A and the second motor bracket 34B and the protruding portions 37A of the stator core 37 in the radial direction.

The thermal grease 60 is disposed in the recess groove 125 as in the drive device 10 of the embodiment. The thermal grease 60 thermally connects the motor housing 34 and the hub 20 to each other in the recess groove 125. This configuration causes the heat of the motor 30 to be efficiently discharged to the hub 20 via the thermal grease 60.

The recess groove 125 is located outside the stator 33 in the radial direction and has a width smaller than the length of the motor housing 34 in the axial direction. Thus, the range in which the thermal grease 60 is disposed is smaller than that in the configurations illustrated in FIGS. 1 and 2, and the usage amount of the thermal grease 60 can be reduced.

In the drive device 10B in the second modified example, the amount of heat to be discharged from the motor 30 to the hub can be adjusted by increasing or reducing the width of the recess groove 125 in the axial direction and increasing or reducing the amount of the thermal grease 60 disposed in the recess groove 125.

In the second modified example, three or more rib portions 124a, 124b may be disposed. Increasing the number of rib portions can prevent the case where the thermal grease 60 leaking out from the recess groove 125 flows around the rib portions and reaches the speed reducer 40.

Although the recess groove 125 extends along the entire inner wall surface of the hub 20 in the circumferential direction in the second modified example, the recess groove 125 may be divided into multiple recess portions in the circumferential direction. Also in this case, since the recess portions and the thermal grease 60 move relative to the outer peripheral surface of the motor housing 34 with rotation of the hub 20, the heat of the motor 30 can be discharged to the hub 20. Accordingly, the thermal grease 60 does not have to be disposed in the recess portions as long as the thermal grease 60 is disposed at a position capable of thermally connecting the hub 20 and the motor housing 34 to each other. This applies also to the aforementioned embodiment and the modified examples.

Figure 4:
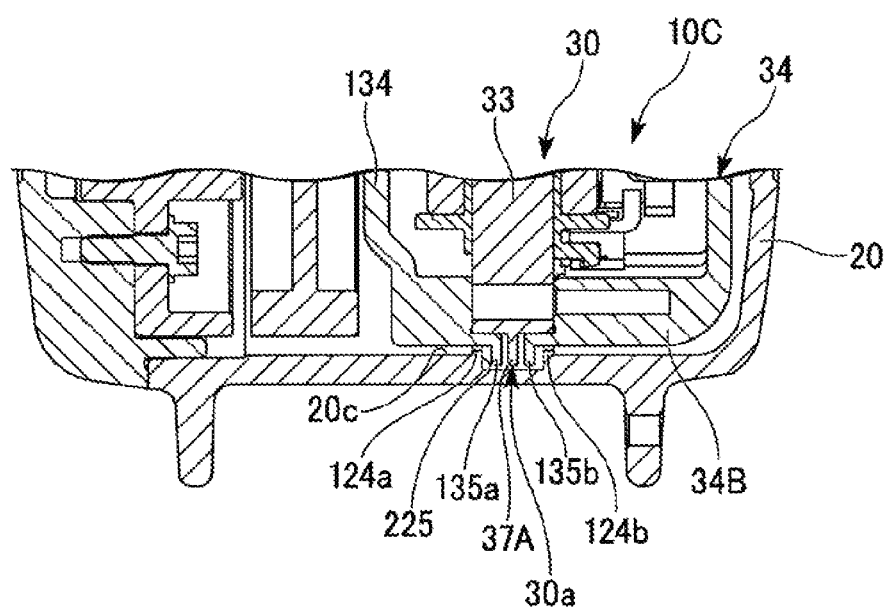
FIG. 4 is a partial cross-sectional view of a drive device according to a third modified example of an example embodiment of the present invention.

FIG. 4 is a partial cross-sectional view of a drive device in a third modified example.

The drive device 10C of the third modified example includes the rib portions 124a, 124b protruding toward the outer peripheral surface of the motor housing 34 on the inner wall surface of the hub 20 and a recess groove 225 located between the rib portions 124a, 124b and recessed toward the outside in the radial direction in the inner wall surface of the hub 20. The recess groove 225 extends around the entire motor housing 34 in the circumferential direction. The recess groove 225 is opened on the inner side in the radial direction. In other words, the drive device 10B includes the recess groove 225 as the recess portion facing the motor housing 34 in the radial direction.

The recess groove 225 in the third modified example is a recess groove formed to be deeper than the recess groove 125 in the second modified example by disposing a bottom surface of the recess groove 225 outside the inner wall surface of the hub 20 in the radial direction.

The motor 30 includes a motor protruding portion 30a protruding toward the outside in the radial direction, on the outer peripheral surface of the motor housing 34. The motor protruding portion 30a includes a first flange portion 135a spreading from an end edge of the first motor bracket 34A on the other side in the axial direction toward the outside in the radial direction, a second flange portion 135b spreading from an end edge of the second motor bracket 34B on the one side in the axial direction toward the outside in the radial direction, and the protruding portions 37A located between the first flange portion 135a and the second flange portion 135b. In other words, part of the stator 33 is disposed between the first flange portion 135a and the second flange portion 135b facing each other in the axial direction.

The radial positions of end edges of the protruding portions 37A of the stator core 37 on the outside in the radial direction are the same as the radial positions of end edges of the first flange portion 135a and the second flange portion 135b of the motor housing 34 on the outside in the radial direction. The motor protruding portion 30a extends toward the outside in the radial direction and is inserted into the recess groove 225. An end edge of the motor protruding portion 30a on the outside in the radial direction is located outside an inner wall surface 20c near the rib portion 124a in the radial direction.

The thermal grease 60 is disposed in the recess groove 225 as in the drive device 10 of the embodiment. The thermal grease 60 thermally connects the motor housing 34 and the hub 20 to each other in the recess groove 225. This configuration causes the heat of the motor 30 to be efficiently discharged to the hub 20 via the thermal grease 60.

In the third modified example, since part of the motor protruding portion 30a is inserted in the recess groove 225, the contact area between the thermal grease 60 and the set of the motor housing 34 and the stator core 37 is greater than that in the second modified example illustrated in FIG. 3 and an excellent heat dissipating performance can be obtained.

In the third modified example, a configuration provided with no rib portions 124a, 124b may be employed. Since the recess groove 225 is recessed from the inner wall surface 20c toward the outside in the radial direction, the recess groove 225 can hold the thermal grease 60. Moreover, since the motor protruding portion 30a extends outside the inner wall surface 20c in the radial direction, contact with the thermal grease 60 can be achieved without the rib portions 124a, 124b.

Features of the above-described preferred embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive device including:
   a hollow hub rotatable about a hub shaft extending parallel to a center axis;
   a motor housed in the hub and fixed to the hub shaft;
   a speed reducer connected to the motor and the hub; and
   an annular wall member; wherein
   the motor includes:
     a rotor including a motor shaft extending parallel to the hub shaft;
     a stator disposed outside the rotor in a radial direction; and
     a motor housing holding the stator therein;
   the drive device includes thermal grease thermally connecting the hub and the motor housing to each other;
   the annular wall member is located between the motor housing and the speed reducer in an axial direction;
   the drive device includes a recess portion opened on an interior in the radial direction on an inner wall surface of the hub facing the motor housing in the radial direction;

the thermal grease thermally connects the hub and the motor housing to each other in the recess portion;

the recess portion is a recess groove extending along an entirety of the inner wall surface of the hub in a circumferential direction; and the annular wall member extends from an inner wall surface of the hub toward the interior in the radial direction.

2. The drive device according to claim 1, wherein the motor housing includes a first motor bracket fixed to one side of the stator in an axial direction and a second motor bracket fixed to the other side of the stator in the axial direction; and the first motor bracket and the second motor bracket face each other with a gap therebetween in the axial direction.

3. The drive device according to claim 1, wherein an inner peripheral end of the annular wall member is located inside an outer peripheral end of the motor housing in the radial direction; and the annular wall member includes a tubular first protruding wall extending in the axial direction from the annular wall member toward the motor housing.

4. The drive device according to claim 3, wherein the motor housing includes a tubular wall extending in the axial direction from a position outside the first protruding wall of the annular wall member in the radial direction toward the annular wall member; and the first protruding wall of the annular wall member and the tubular wall of the motor housing face each other in the radial direction.

5. The drive device according to claim 1, wherein the recess portion is located in a region of the inner wall surface of the hub that faces the motor housing.

6. The drive device according to claim 1, wherein the stator is partially exposed from the motor housing.

7. The drive device according to claim 6, wherein the stator includes a protruding portion protruding toward an exterior in the radial direction, at a position where the stator is exposed from the motor housing.

8. The drive device according to claim 1, wherein the thermal grease has a same composition as grease in contact with the speed reducer.

\* \* \* \* \*